United States Patent [19]

Yates

[11] 4,228,974

[45] Oct. 21, 1980

[54] PROTECTIVE DEVICE FOR INSTRUMENTS AND LOCKING OF AIRCRAFT CONTROLS

[75] Inventor: August B. Yates, Orlando, Fla.

[73] Assignee: J. Talmadge Webb, Satellite Beach, Fla.

[21] Appl. No.: 12,463

[22] Filed: Feb. 15, 1979

[51] Int. Cl.³ ................... B64C 13/14; B64D 47/00; E05D 73/00

[52] U.S. Cl. ....................... 244/224; 70/58; 70/167; 244/1 R

[58] Field of Search ............... 244/83 A, 1 R; 74/495; 70/14, 57, 58, 158, 163, 164, 167, 199, 200, 253, 211, 212; 312/215; 248/27.1; 160/351; 49/503; 73/431

[56] References Cited

U.S. PATENT DOCUMENTS

| | | | |
|---|---|---|---|
| 2,900,148 | 8/1959 | Nickels | 244/83 A |
| 3,348,391 | 10/1967 | Barnwell | 70/211 |
| 3,699,787 | 10/1972 | Corrado | 70/58 |
| 3,898,823 | 8/1975 | Ludeman | 244/83 A |

Primary Examiner—Barry L. Kelmachter
Attorney, Agent, or Firm—Berman, Aisenberg & Platt

[57] ABSTRACT

A device for locking the ailerons and elevators of an aircraft controlled by a wheel-operated longitudinally shiftable and rotatable control column, and, at the same time preventing theft of the navigational instruments and radio equipment mounted on the instrument panel in the cockpit of the plane. The protective device takes the form of a cover plate mounted immediately adjacent the instrument panel by means of upper and lower clamping blocks secured about the control column in such a manner as to prevent unauthorized movements of the column and access to the instruments on the panel. The blocks have complementary semi-cylindrical grooves which clamp about the control column, and one block is fixed to the cover plate while the other has sliding, tongue and groove engagement to couple with said one block and clamp the control column against movement. The pair of blocks are held in clamped arrangement by a padlock whose shackle passes through aligned apertures in the blocks.

7 Claims, 4 Drawing Figures

U.S. Patent
Oct. 21, 1980
4,228,974
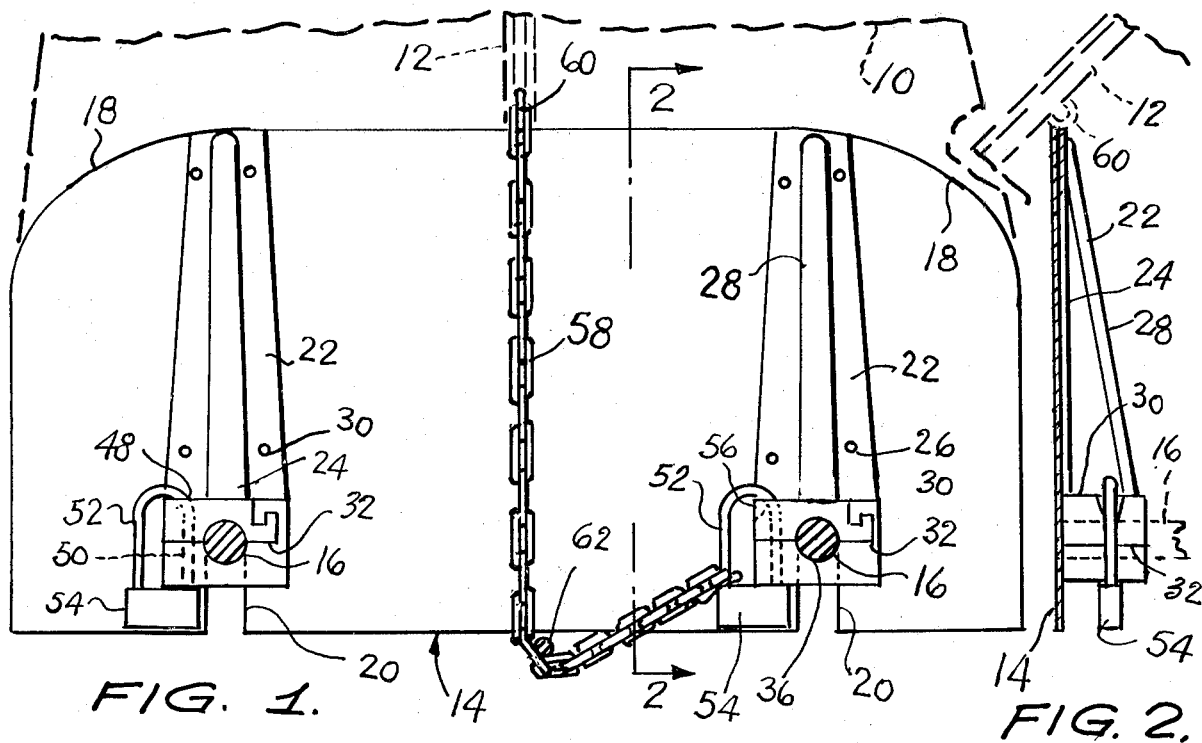
FIG. 1.
FIG. 2.
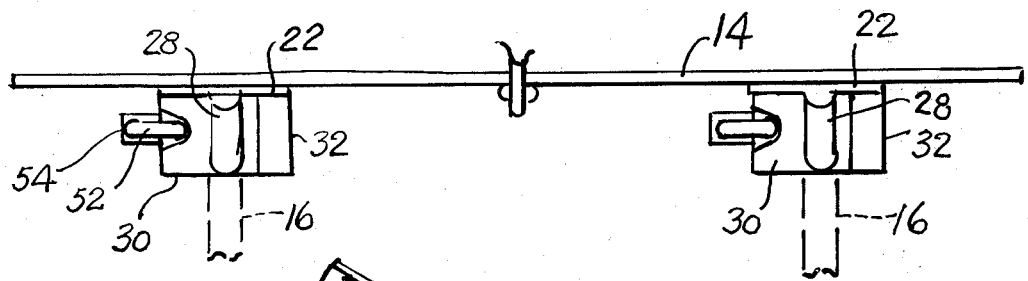
FIG. 3.
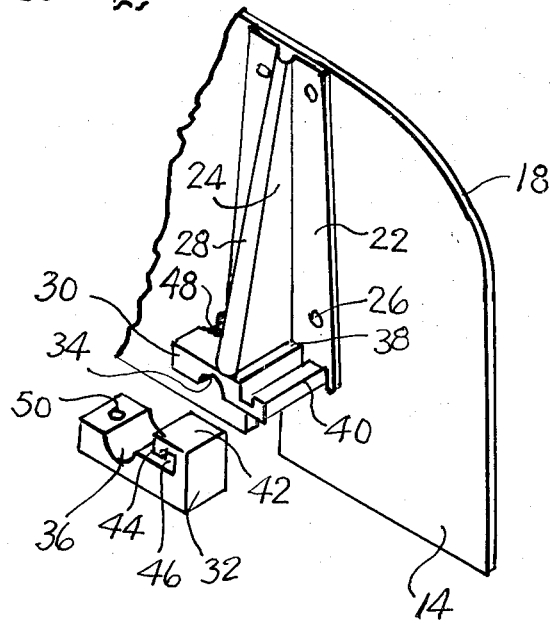
FIG. 4.

PROTECTIVE DEVICE FOR INSTRUMENTS AND LOCKING OF AIRCRAFT CONTROLS

BACKGROUND OF THE INVENTION

1. Field of the Invention

This invention relates generally to aircraft devices, and more particularly, to an improved device for locking the ailerons and elevators of an aircraft so as to prevent unauthorized flight of a parked plane and also, for preventing theft of instruments or equipment from the instrument panel.

It is common knowledge that most light aircraft, for private use, are provided with cable operated controls including ailerons and elevators connected to a column, or shaft, turned by a wheel or yoke. The elevators during flight being positioned by pushing forward or pulling back the column in its longitudinal direction, and the ailerons being positioned by rotating the wheel.

Often such aircraft are not hangared, but merely tied down outside in a remote location on an airfield when not in use, so as to be subject to theft not only of the aircraft instruments, but also the aircraft itself. In general, the navigational instruments and radio equipment are constructed so that they can be readily installed or removed for repair or replacement from the front of the instrument panel. Accordingly, the removal and theft of the instruments and often the theft of the entire aircraft by flight from its parked position have become important concerns to the owners of such small aircraft.

2. Description of the Prior Art

A number of devices have been patented which are directed toward overcoming the problems briefly outlined above. Among these, U.S. Pat. No. 3,699,787 issued to Ronald F. Corrado, discloses a hollow cover which is mounted over a control column and directly in front of the instrument panel. The cover is locked in place by a tumbler lock which cooperates with a locking device fixed in the instrument panel. While this patent offers protection against theft of the instruments, it does not prevent a thief from manipulating the control shaft and connected wheel to fly the airplane away.

The Russel S. Ludeman U.S. Pat. No. 3,898,823, discloses a device for locking the controls of an aircraft which includes brackets secured to the pedals and wheel and connected by a tubular housing enclosing a piston-like spring device which resiliently locks the wheel and control column against movement when parked, so as to prevent unauthorized flights of the aircraft. It does not, however, offer any means to cover and prevent theft of the instruments from the instrument panel.

SUMMARY OF THE INVENTION

It is a primary object of the invention to provide a single device which both locks the aircraft controls and prevents theft of the aircraft instruments, thus solving the problems outlined above and overcoming the defects and disadvantages of the prior art devices.

It is another important object of the invention to provide a protective device which is of simple construction, easy and inexpensive to fabricate, easy to install and is readily removable.

Yet another important object of the invention is to provide a protective device, having the above described characteristics, which include a cover plate for mounting directly adjacent and in front of the instrument panel, said cover plate having mounting and locking means which cooperate with the control column of the aircraft and which clamp the control column against movements which would permit unauthorized takeoff and flight.

These and other objects of the invention are achieved in a preferred embodiment by provision of a generally flat plate which is positioned immediately adjacent and in front of the aircraft instrument panel, and locked in such position by a pair of complementary clamping blocks which grip the control column of the aircraft and are secured by a padlock, at least one of the blocks being rigidly affixed to the cover plate.

The invention will be better understood and objects other than those set forth above will become apparent from reading the following detailed description thereof. Such description presenting a preferred embodiment of the invention which is illustrated in the annexed drawings.

BRIEF DESCRIPTION OF THE DRAWINGS

FIG. 1 is an elevational view of a protective cover device according to the invention installed in an aircraft cockpit;

FIG. 2 is a sectional view taken along line 2—2 of FIG. 1, and looking in the direction of the arrows;

FIG. 3 is a top plan view of the installed cover of FIG. 1; and

FIG. 4 is a fragmentary perspective view showing a portion of the cover plate with one of the pairs of clamping blocks in exploded view ready to be assembled in clamping relation.

DESCRIPTION OF THE PREFERRED EMBODIMENT

Referring now to the drawings in greater detail, an outline portion of the front of the cockpit of a typical light aircraft is shown at 10 as having a rearwardly inclined center frame strut 12 in the windshield. The base of the strut is directly above the center of the instrument panel, not visible in the drawings since it is covered and protected by an upstanding protective plate generally indicated at 14.

The illustrated cockpit is one for a two-place light aircraft having the usual command pilot and co-pilot control shafts or columns 16,16 to be moved longitudinally forward and backward to operate the elevators (not shown) and rotated right or left by wheels, or yokes (not shown), to operate the ailerons, also not visible in the drawings.

The cover plate 14 is a generally rectangular, flat, strong, rigid plate having rounded upper corners 18,18, and preferably formed of a lightweight metal, such as aluminum or aluminum alloy, or a reinforced plastic. The area of plate 14 is made sufficiently large to completely cover the instrument clusters on the instrument panel so as to prevent unauthorized removal of the instruments.

A pair of slots 20,20 are formed or cut out from the bottom edge of cover plate 14. The slots are slightly larger than the diameter of control columns 16,16 so that the plate may be lowered over columns 16,16 which ride upwardly in the slots to their upper ends, a short distance above the bottom edge of the plate. A brace comprising a narrow, flat plate 22, and a perpendicular rib 24 is affixed to plate 14, above each slot 20, by rivets 26, or other suitable means. The brace is also preferably formed of metal, and rib 24 has a triangular shape tapering to a point at its upper end. The outer edge 28 of the rib is rounded and the inner edge is welded or otherwise integrated with plate 22.

For clamping each control column, there is provided a pair of complementary blocks 30,32 formed of metal, or other suitable material. The upper block 30 is welded or otherwise integrally affixed to brace plate 22 and has a downwardly opening, semicylindrical recess 34 for tightly receiving the shaft, or control column 16, at the top of slot 20. A similar and mating recess 36 is formed in the unattached, or free, clamping block 32. The upper face of block 30 has a groove 38 parallel to recess 34 and which leaves an upstanding tongue 40 at the edge of the block. The upper face of block 32 is provided with an upstanding projection 42 having the shape of an inverted "L" in cross-section so as to form a downwardly facing tongue 44 and groove 46 which slidingly interfit groove 38 and tongue 40 when block 32 is moved toward block 30 in a direction parallel to the axis of semicylindrical recess 34. The mating of the tongues and grooves 38-46 serve to hold the upper and lower blocks together at one side. To complete the securement and clamping action of the blocks, each is provided at the left side, as viewed in FIG. 4, with vertical aligned through holes 48,50 which pass one leg of the shackle 52 of a padlock 54. To enable the shackle to be inserted more easily, the upper end of hole 48 is enlarged at 56 as best seen in FIG. 2. A short length of chain 58 is attached to one padlock shackle at one end and to an eyelet 60 affixed in the aircraft frame rib 12. The chain 58 is desirably trained about a strut or brace 62, extending horizontally from the frame below the instrument panel. The chain prevents a thief from prying the upper edge of the plate 14 away from the instrument panel.

In use of the protective panel, when the aircraft has been parked and tied down on the airfield, the control yokes are positioned in the full climb direction (pulled completely toward the pilot) to prevent taxiing and flight by unauthorized persons. The plate 14 is then lowered to seat the control columns 16,16 in recesses 34,34 of the upper clamping blocks with the plate vertically, flush against and covering the instrument panel. The lower clamping blocks 32,32 are then placed under columns 16,16 with the columns seated in recesses 36,36 and the lower blocks are then slid forwardly to fully engage the interfitting tongues and grooves 38-46 so that the lower block abuts plate 14. At this point holes 48,50 are aligned and the padlock shackles are inserted and the padlocks locked. This draws the blocks more tightly together to rigidly clamp the control columns against longitudinal and rotary movement. Since the plate 14 is held flush against the instrument panel by the locking action of the clamping blocks and chain 58, thieves are prevented from easy access to the instruments. It should further be pointed out that many small aircraft are provided with a pin under or near the instrument panel that drops through the control column to prevent control surface movements due to wind. The plate 14, when locked in place, prevents said pin from being removed from the control column.

When an authorized person desires to fly the aircraft, he merely unlocks the padlocks 54,54 and removes plate 14 from the instrument panel and control column by reversing the installation procedure described above.

It should be obvious that the described embodiment of the invention may be readily tailored in size and shape to fit various conventional light aircraft having somewhat different configurations. Changes in details are also possible and obvious. For example, the frictional clamping force of the locking blocks may be improved by adhering thin rubber strips to the cylindrical surfaces 34,36. Where only a single control column 16 is present only one pair of clamping blocks 30,32 are required. In such instance, to prevent turning of the plate 14 in its own plane, side or top brackets may be fixed to the aircraft face to engage with the edge of the plate.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. In an aircraft having an instrument panel and controls for ailerons and elevators, said controls including at least one column turned by a hand operated yoke and movable axially for controlling the ailerons and elevators respectively, a protective device for preventing theft of the aircraft instruments from said panel and preventing unauthorized flight removal of the aircraft from a parking area, said device comprising a protective instrument cover, and means for lockingly mounting said cover in a position immediately adjacent the aircraft instrument panel and to said at least one column in such manner as to prevent unauthorized movements of said at least one column and the ailerons and elevators controlled thereby, said means for lockingly mounting the cover comprises first and second complementary blocks which clamp about said at least one column to prevent its movements, said first block being fixed to said cover and the second block being separable from the first, and means for locking the blocks together.

2. A protective device as set forth in claim 1, wherein said cover comprises a substantially planar, rigid plate.

3. A protective device as set forth in claim 1, wherein said first and second blocks have complementary semicylindrical surfaces which frictionally clamp about said at least one column, and said means for locking the blocks comprises complementary tongue and groove surfaces which enable the second block to slidably engage and interfit with the first block.

4. A protective device as set forth in claim 3, wherein said tongue and groove surfaces are parallel to said semicylindrical surfaces, and said means for locking the blocks further includes a through aperture in each of said blocks which are aligned when the blocks are positioned for clamping the at least one column, and a padlock having a shackle insertable through said aligned apertures to secure the blocks in clamped condition.

5. A protective device according to claim 4, wherein said means for lockingly mounting the cover further comprises a chain fixedly secured at one end to a portion of the aircraft cockpit adjacent the top of said cover and affixed to said padlock at its other end.

6. A protective device according to claim 1, wherein said first block is further secured to cover reinforcing means extending vertically upwardly of the cover.

7. A protective device according to claim 1, wherein said first and second blocks have complementary semicylindrical surfaces which frictionally clamp about said at least one column, said cover having a slot extending upwardly from its bottom edge and aligned with the semicylindrical surface of the first block to permit mounting and removal of the plate over said at least one column.

* * * * *